(12) United States Patent
Toki et al.

(10) Patent No.: US 9,268,157 B2
(45) Date of Patent: Feb. 23, 2016

(54) ILLUMINATION CONTROL

(71) Applicant: Empire Technology Development LLC, Wilmington, DE (US)

(72) Inventors: Motoyuki Toki, Kyoto (JP); Sayoko Tanaka, Osaka (JP); Masumi Honda, Hyogo (JP)

(73) Assignee: Empire Technology Development LLC, Wilmington, DE (US)

( * ) Notice: Subject to any disclaimer, the term of this patent is extended or adjusted under 35 U.S.C. 154(b) by 258 days.

(21) Appl. No.: 13/824,276

(22) PCT Filed: Oct. 26, 2012

(86) PCT No.: PCT/US2012/062219
§ 371 (c)(1),
(2) Date: Mar. 15, 2013

(87) PCT Pub. No.: WO2014/065823
PCT Pub. Date: May 1, 2014

(65) Prior Publication Data
US 2014/0321162 A1    Oct. 30, 2014

(51) Int. Cl.
*G02F 1/01* (2006.01)
*G02F 1/1335* (2006.01)
*F21K 99/00* (2010.01)

(52) U.S. Cl.
CPC ............... *G02F 1/0105* (2013.01); *F21K 9/50* (2013.01); *G02F 1/133611* (2013.01); *G02F 2203/62* (2013.01)

(58) Field of Classification Search
CPC ............ G02F 1/133611; G02F 1/0105; G02F 2203/62; F21K 9/50
See application file for complete search history.

(56) References Cited

U.S. PATENT DOCUMENTS

| | | | |
|---|---|---|---|
| 5,296,321 A | 3/1994 | Kawanishi et al. |
| 6,033,774 A | 3/2000 | Yitzchaik et al. |
| 6,057,899 A | 5/2000 | Tanaka et al. |
| 6,265,034 B1 | 7/2001 | Kagawa et al. |
| 6,366,388 B1 | 4/2002 | Hampp |
| 6,493,128 B1 | 12/2002 | Agrawal et al. |
| 7,473,448 B2 | 1/2009 | Shukla et al. |
| 7,667,787 B2 | 2/2010 | Mahama et al. |
| 7,911,673 B1 | 3/2011 | Yap |
| 7,935,396 B2 | 5/2011 | Matsumori et al. |
| 2004/0063006 A1 | 4/2004 | Takahashi et al. |

(Continued)

FOREIGN PATENT DOCUMENTS

| | | |
|---|---|---|
| JP | 2000-250074 | 9/2000 |
| JP | 2006-310042 | 11/2006 |

(Continued)

OTHER PUBLICATIONS

Bohren et al., "Absorption and Scattering by a Sphere", Ch. 4, pp. 82-129, 2004.

(Continued)

*Primary Examiner* — Thomas M Sember
(74) *Attorney, Agent, or Firm* — Knobbe, Martens, Olson & Bear, LLP

(57) ABSTRACT

The methods, devices, and/or compositions described herein can be used to reduce variations, such as spatial and temporal variations, in luminance intensity. Luminance variation is reduced by varying some aspect of transmittance with respect to the intensity of light.

27 Claims, 16 Drawing Sheets

(56) References Cited

U.S. PATENT DOCUMENTS

| | | | |
|---|---|---|---|
| 2006/0187806 | A1 | 8/2006 | Balistreri et al. |
| 2007/0004046 | A1 | 1/2007 | Abbott |
| 2007/0045629 | A1 | 3/2007 | Chin et al. |
| 2008/0219129 | A1 | 9/2008 | Kamada |
| 2010/0060133 | A1 | 3/2010 | Tamura et al. |
| 2011/0095243 | A1 | 4/2011 | Raymo et al. |
| 2012/0250350 | A1 | 10/2012 | Kim et al. |

FOREIGN PATENT DOCUMENTS

| | | |
|---|---|---|
| JP | 2008/265144 | 11/2008 |
| JP | 2010-020179 | 1/2010 |
| JP | 2010-140721 | 6/2010 |
| TW | 239882 | 2/1995 |
| TW | 340910 | 6/1997 |
| TW | 507175 | 10/2002 |
| WO | WO 00/71482 | 11/2000 |
| WO | WO 2006/044475 | 4/2006 |
| WO | WO 2008/001578 | 1/2008 |
| WO | PCT/US2012/062219 | 10/2012 |

OTHER PUBLICATIONS

U.S. Appl. No. 13/702,991, filed Dec. 7, 2012, Fukui.

Azobenzene (from Wikipedia), information was available at website: http://en.wikipedia.org/wiki/Azobenzene, in some form no later than Dec. 14, 2011.

Cis-Stilbene, information was available at website: http://www.chemicalbook.com/ChemicalProductProperty_EN_CB8211190.htm, in some form no later than Dec. 14, 2011.

Doctoral thesis of Keishi Nishio at the Depart of Materials Science and Technology at Graduate School of Industrial Science and Technology at the Science University of Tokyo titled "Fabrication of all-solid-state electrochromic display by the sol-gel method and performace evaluation."

Enplas Corporation, information was available at website: www.enplas.co.jp/business/led/light_enhancer_cap.html, in some form no later than Dec. 14, 2011.

(E)-Stilbene (from Wikipedia), information was available at website: http://en.wikipedia.org/wiki/(E)-Stilbene, in some form no later than Dec. 14, 2011.

Example of Refractive Indes Anisotropy of Azobenzene Derivative, Kumamoto University; information was available at website: http://jstshingi.jp/abst/p/11/1120/9o214.pdf, in some form no later than Dec. 14, 2011.

Glass Gallery 291, information was available at website: http://gg291.com/product2/product1/product1-3-3.html, in some form no later than Dec. 14, 2011.

International Search Report and Written Opinion dated Jan. 8, 2013, received in International Application No. PCT/US2012/062219.

International Search Report and Written Opinion received in International Application No. PCT/US2012/044322, mailed on Sep. 11, 2012, filed on Jun. 27, 2012.

Kim et al., "Photoinduced Retractive Index Change of a Photochromic Diarylethene Polymer," Macromolecules, 1999, pp. 4855-4860, vol. 32.

Okada et al., "Cis-Trans Isomerization of Stilbene Compounds and Their Content in Polygonum Cuspidatum (Polygonaceae)," Naturalistae, 2009, pp. 17-21, vol. 14.

Sato Laboratory, Institute for Materials Chemistry and Engineering, Kyushu University, Fukuoka, Japan, information was available at website: http://www.cm.kyushu-u.ac.jp/dv14/index.php?lang=en&page=Top, in some form no later than Dec. 14, 2011

Technical Data of Optical Waveguide Spectrometer: In-Situ Measurement of Electrochemistry; information was available at website: http://www.sic-tky.com/products/sis/data.html, in some form no later than Dec. 14, 2011. (with English translation).

"MiePlot," A computer program for scattering of light from a sphere using Mie theory & the Debye series, accessed at http://web.archive.org/web/20111215131914/http://www.philiplaven.com/mieplot.htm, accessed on Jan. 22, 2015, pp. 1-7; original publication date unknown; website identifies Aug. 9, 2011 as page last updated on.

"The Umm film," accessed at http://web.archive.org/web/20120502195639/http://umu.jp/product/film/index.html, accessed on Jan. 22, 2015, p. 1; original publication date unknown; website identifies 2002 as copyright date for webpage.

Shishido, A., et al., "Rapid Optical Switching by Means of Photoinduced Change in Refractive Index of Azobenzene Liquid Crystals Detected by Reflection-Mode Analysis," ACS, J. Am. Chem. Soc., vol. 119, No. 33, pp. 7791-7779 (Aug. 20, 1997).

Fresnel Equations, from Wikipedia; information was available at website: http://en.wikipedia.org/wiki/Fresnel_equations. There is no publication date but the page was last modified on Jan. 6, 2014.

Irradiance, from Wikipedia; information was available at website: http://en.wikipedia.org/wiki/Irradiance. There is no publication date but the page was last modified on Dec. 12, 2013.

Schmidt, et al., Slit Heigh Corrections in Small Angle X-ray Scattering. Acta Cryst. (1960) 13, 480-483.

Bohren et al.,"Absorption and Scattering by a Sphere", pp. 99-106, 2007.

"Refractive index and extinction coefficient of thin film materials," accessed at https://web.archive.org/web/20150522032221/http://en.wikipedia.org/wiki/Refractive_index_and_extinction_coefficient_of_thin_film_materials, last modified on Mar. 15, 2015, pp. 8.

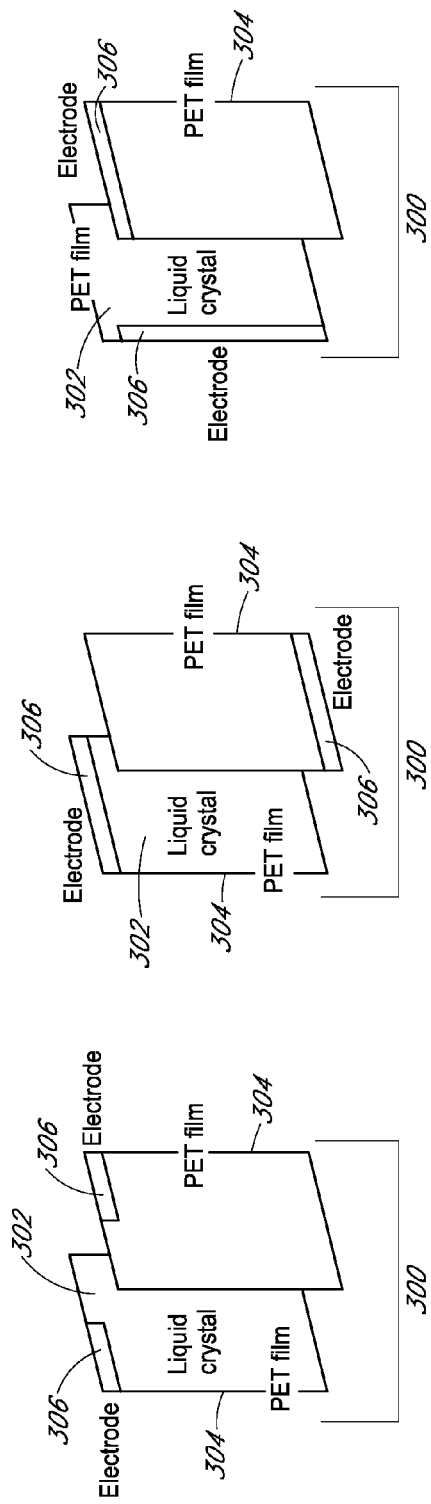
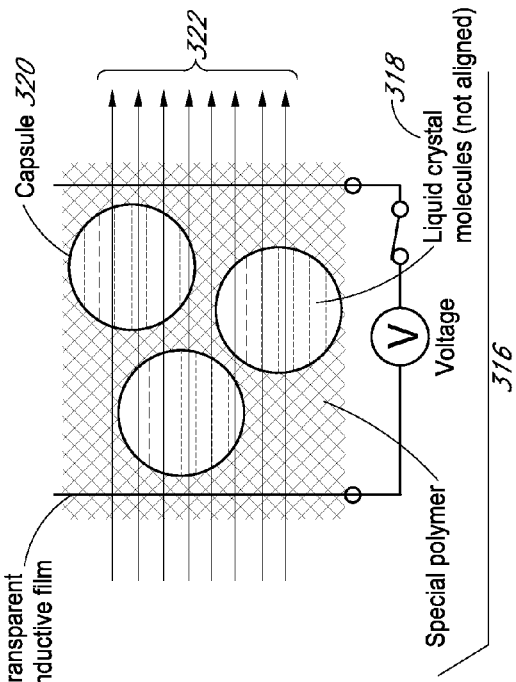
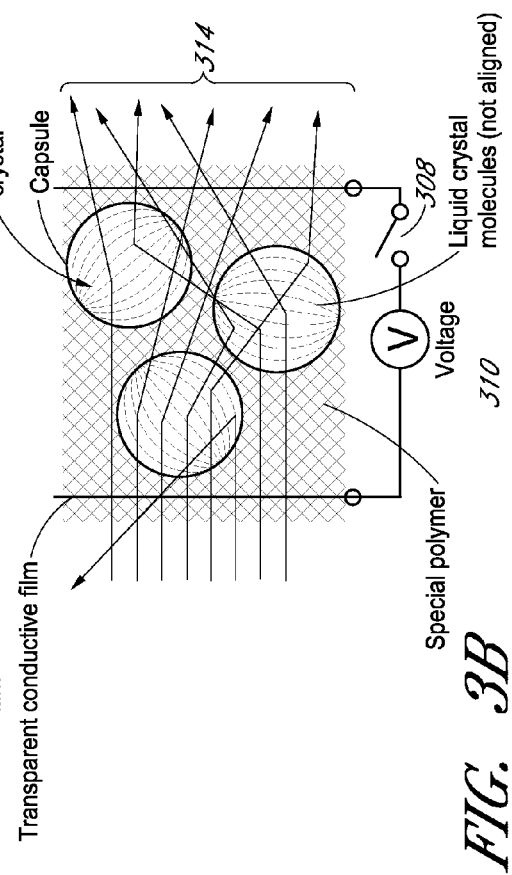
FIG. 3A
FIG. 3B

Tungsten trioxide (WO$_3$) and iridium oxide (Ir$_2$O$_4$·(a-1)H$_2$O thin film)

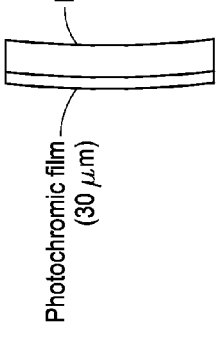

| | Film thickness (μm) | Liquid application surface | Ultraviolet irradiation surface | Structure |
|---|---|---|---|---|
| First embodiment | 30 | Concave side of mold | Concave side of mold | Photochromic film (30 μm) / Lens substrate |
| Second embodiment | 60 | Concave side of mold | Concave side of mold | Photochromic film (60 μm) / Lens substrate |
| Fourth embodiment | 30 | Concave side of mold | Concave side of mold | Anti-reflective layer / Hard coating layer / Photochromic film / Lens substrate |
| Comparative example | 30 | Convex side of lens substrate | Convex side of lens substrate | Photochromic film (30 μm) / Lens substrate |

FIG. 10

ILLUMINATION CONTROL

CROSS-REFERENCE TO RELATED APPLICATION

This application is the U.S. national phase entry under 35 U.S.C. §371 of PCT/US2012/062219, filed on Oct. 26, 2012, the entire disclosure of which is hereby incorporated by reference herein.

TECHNICAL FIELD

Methods, compositions, and/or devices for manipulating illumination from a light source are provided.

BACKGROUND

Light-emitting diodes (LEDs) are a semiconductor light source, which are increasingly replacing conventional fluorescent lamps and incandescent lamps. LEDs are energy saving, have a relatively long useful life, and generally fail by dimming over time, unlike incandescent lamps which fail abruptly.

SUMMARY

Several embodiments disclosed herein relate to a diffusion lens and/or substrate for a light source. In some embodiments, the diffusion lens includes a light diffusing layer where transmittance properties through the diffusing layer can be variably adjusted to vary inversely with respect to intensity of light impacting the diffusing layer so that variations in luminance are reduced over the surface of the lens.

Several embodiments described herein relate to a method of modulating luminous intensity of light from a light source, the method including the steps of: providing at least one light source, providing a luminance adjusting layer interposed between a viewer and the at least one light source, and adjusting a transmittance properties of the luminance adjusting layer in accordance with a luminous intensity of light from the at least one light source such that transmittance properties of the luminance adjusting layer varies inversely with luminous intensity.

Several embodiments described herein relate to a light source including: a substrate; and a light diffusing layer configured to adjust light transmittance properties through the layer in accordance with luminous intensity so as to reduce differences in the luminous intensity of light exiting the light source.

Several embodiments described herein relate to a method of modulating luminous intensity of light from a light source, including the steps of: providing at least one light source, providing a luminance adjusting layer interposed between a viewer and the at least one light source, and directing light from the light source to the luminance adjusting layer such that transmittance properties from the luminance adjusting layer varies inversely with luminous intensity.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a better understanding of the invention and to show how it can be carried into effect, reference will be made, by way of example, to the accompanying drawings, in which:

FIG. 2 includes FIG. 2A and FIG. 2B.

FIG. 3 includes FIG. 3A and FIG. 3B. FIG. 3A is an illustration of some embodiments of a luminance adjusting layer including a liquid crystal layer between two transparent conductive layers. The placement of the electrodes in the three luminance adjusting layers shown in FIG. 3A (left, middle, right) can be varied.

FIG. 3B is an illustration of the affect of voltage application on crystal alignment and transmittance properties of the luminance adjusting layer. In the absence of voltage (left panel) liquid crystal molecules are arranged randomly resulting in reduced transmittance to an area adjacent to the altered section of the luminance adjusting layer. When voltage is applied to the luminance adjusting layer the liquid crystal molecules align resulting in increased transmittance.

FIG. 10 includes various schematic representations of various structural arrangements of photochromic layers.

DETAILED DESCRIPTION

Figure 1A:
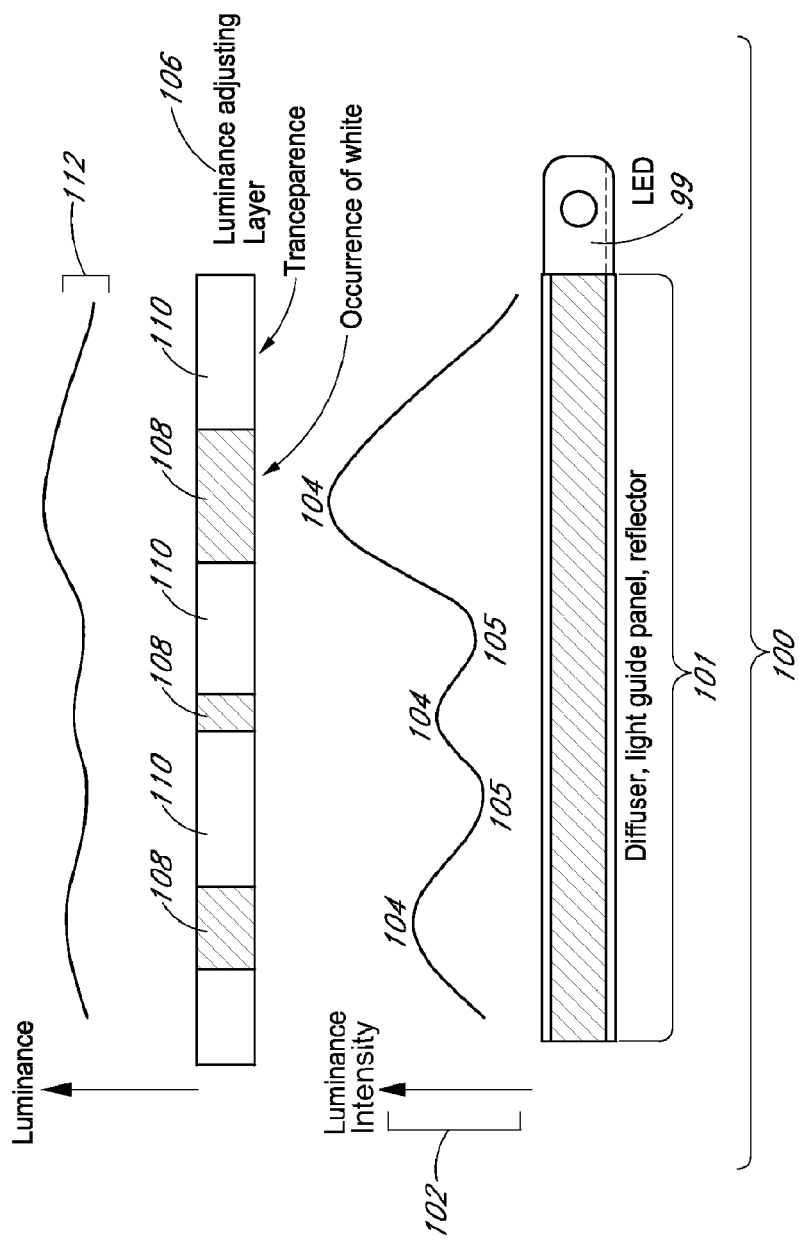
FIG. 1A is a schematic depiction of some embodiments showing a reduction in luminance variation observed from a light source by a luminance adjusting layer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

There is interest in large-size planar lights using LED lights for wall and ceiling lights. However, LED lights are expensive compared with conventional light sources, and the light beams emitted from LED lights are monoaxial, lacking spatial expansion, which makes them difficult to apply to uses needing a distributed light field.

In conventional planar LED lights, a reflector or a light guide is used to spread out light emitted from LEDs two-dimensionally and uniform luminance is achieved by using a diffuser. In some situations, conventional planar LED lights have considerable variation in the luminance of planar lighting when the number of LEDs is small. While luminance variation can be reduced by adjusting the number and density of LEDs used in the planar light source, such a solution increases costs of production and reduces energy efficiency.

In some embodiments provided herein, layers that reduce luminance variation can be used to provide substantially uniform lighting (or lighting with increased uniformity), thus reducing both material and energy costs for large-size planar lights by allowing for the use of reduced numbers of LED elements. Such layers can be used in a wide variety of applications. For example, such a layer can be used where substantially uniform luminance intensity is desired.

In some embodiments described herein, luminance variation can be reduced by varying transmittance properties inversely with respect to the intensity of light. Thus, transmittance is altered (for example, an absolute reduction in transmittance or by localized redirection of the transmitted light) in response to high (or low) luminance intensity from a light source thereby reducing luminance variation. Some embodiments described herein can be useful, for example, in reducing luminance variation that occurs over time due to LED aging and/or as a result of changes in temperature and/or in cases where the intensity of light impacting a light transmitting surface varies from point to point over the surface.

Some embodiments described herein reduce luminance variation by providing a luminance adjusting layer on a light transmitting surface in which the transmittance properties of the layer varies inversely with respect to intensity of the light impacting the layer. In some embodiments, transmittance of incident light through the layer is attenuated, for example, by becoming partially clouded, in response to high luminance intensity or by becoming more transmittant in response to low light intensity, thereby reducing luminance variation.

FIG. 1A depicts some embodiments of a layer that can reduce variations. Light is emitted from a planar light source 100 including a LED 99 and a light guide and/or reflector and/or diffuser 101 in optical communication with the LED. The amount of light coming from the planar light source 100 varies in luminance intensity 102 from point to point along the light source. Some areas of illumination have relatively higher luminance intensity 104 than other areas (shown as the trough 105 between the peaks 104). Where areas of higher luminance intensity impact the luminance adjusting layer 106, the luminance adjusting layer 106 is configured to reduced and/or redirect transmittance selectively in those areas 108 compared to areas on the layer 106 impacted by relatively low luminance intensity 110. This selectivity, selectively impacts light passing through the luminance adjusting layer 106 such that light on the other side of the layer shows a reduced variation in luminance intensity 112. In some embodiments, light can pass through in the opposite direction.

Figure 1B:
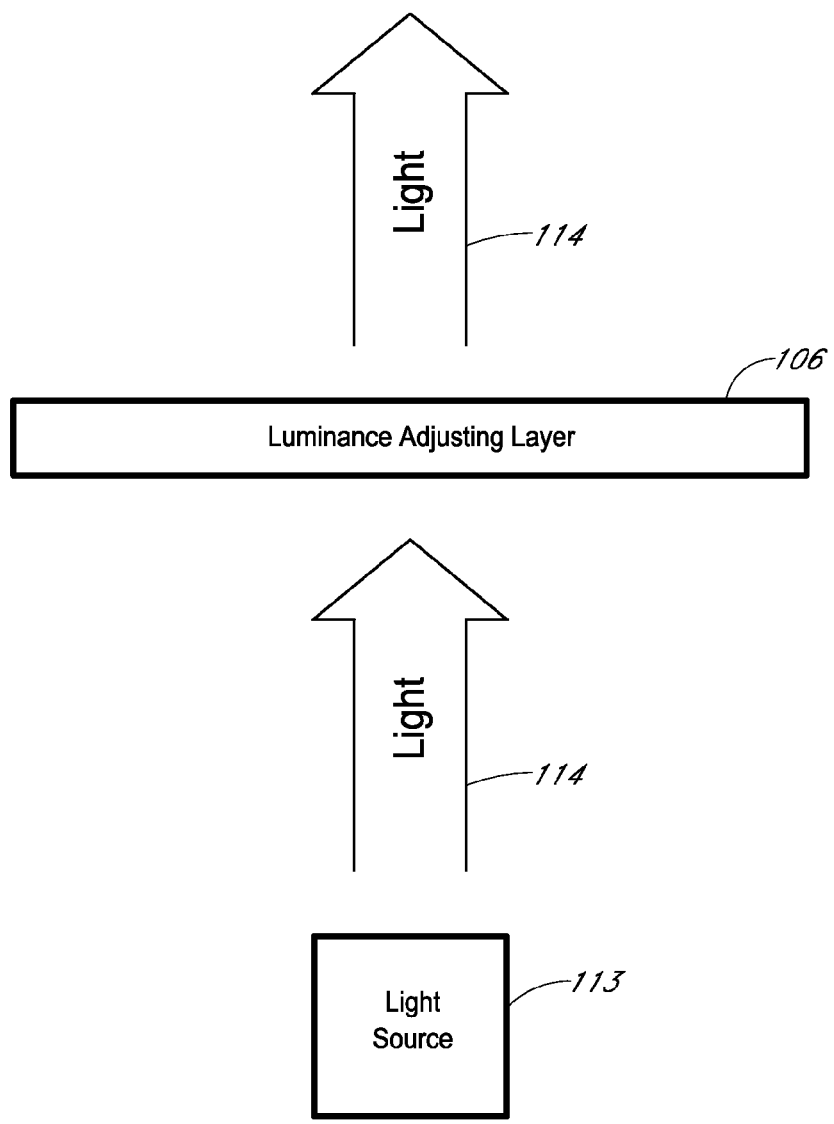
FIG. 1B is an illustration of some embodiments including a luminance adjusting layer and a light source.

FIG. 1B depicts some embodiments including a luminance adjusting layer 106 and a light source 113. Light 114 emitted from the light source 113 passes through the luminance adjusting layer 106.

In some embodiments, altering the transmittance properties of the luminance adjusting layer can include altering the diffraction and/or light guiding properties of the layer such that light passing through the layer is redirected (thereby redistributing the light that passes through the layer and altering any peaks and/or troughs in illumination). In some embodiments, altering the transmittance properties of the luminance adjusting layer can include a decrease in light transmittance through the layer at a point on the "far side" (opposite of the light source) of the layer, thereby reducing any peaks in the illumination source.

In some embodiments, luminance variation can be spatial or temporal. In instances of spatial luminance variation, variations can be reduced across a surface by providing a luminance adjusting layer in which light transmittance (and/or the transmittance properties) from point to point varies inversely with respect to intensity of the light impacting the layer. In some embodiments, transmittance of light at portions of the layer subject to relatively high luminance intensity is attenuated, or, alternatively, transmittance of light at portions of the layer subject to relatively low luminance intensity is increased, thereby reducing the luminance variation over the surface.

In instances of temporal variation, variations can be reduced by providing a luminance adjusting layer in which light transmittance (including the transmittance properties) varies inversely with respect to intensity of the light impacting the layer at any point in time. Transmittance properties of light at portions of the layer subject to relatively high luminance intensity is attenuated (or redirected), or, alternatively, transmittance (and/or the transmittance properties) of light at portions of the layer subject to relatively low luminance intensity is increased (or redirected), thereby reducing the luminance variation over time.

In some embodiments, reduced luminance variation includes a decrease in the change in luminous intensity of light passing through a first portion and a second portion of a surface having a luminance adjusting layer. In some embodiments, reduced luminance variation is a decrease in the change in luminous intensity of light passing through a first portion and a second portion of a surface having a luminance adjusting layer compared to a change in luminous intensity of light passing through a first portion and a second portion of a comparable surface without a luminance adjusting layer. Reduced luminance variation can also be applicable in the change (or lack thereof) in the luminance intensity of light passing through a surface having a light diffusing layer at a first and second time point. In some embodiments, reduced luminance variation encompasses a decrease in the change in luminous intensity of light passing through a surface with a luminance adjusting layer at a first and second time point compared to a change in luminous intensity of light passing through a comparable surface without a luminance adjusting layer at a corresponding first and second time point.

In some embodiments, a luminance adjusting layer can be composed of any material or combination of materials capable of inversely varying its transmittance properties (including, for example, absolute transmittance and/or transmittance direction) with respect to the intensity of light. For example, a luminance adjusting layer can include one or more polymer-dispersed liquid crystals (PDLCs), electrochromatic materials, and photochromic materials. Examples of liquid crystals include, but are not limited to, smectic liquid crystals, nematic liquid crystals, cholesteric liquid crystals, and columnar liquid crystals. Examples of electrochromatic materials include, but are not limited to, polyaniline, viologens, polyoxotungstates, tungsten oxide, titanium dioxide, metal oxides, conjugated conducting polymers, metal coordination complexes, and metal hexacyanometallates. Examples of photochromic materials include, but are not limited to, triarylmethanes, stilbenes, azastilbenes, nitrones, fulgides, spiropyrans, naphthopyrans, spiro-oxazines, and quinones.

In some embodiments, the luminance adjusting layer can be composed of any material or combination of materials capable of altering the direction of light transmittance (and/or the transmittance properties). Thus, in some embodiments, rather than reducing light transmittance (for example, less light on one side of the layer vs. the other side of the layer), the section of the luminance adjusting layer that is to "reduce" peaks in light intensity, can redirect (for example by diffraction) such light, so that light is not as focused at that a location proximal to that section of the light adjusting layer. Thus, in some embodiments, a "reduction" in the intensity of light passing through the layer is actually a reduction in luminance ($cd/m^2$) on a second side (the "far side") of the layer as compared to an amount of luminance on a first side of the layer. In such an embodiment, the light can be redirected and/or diffracted to other sections of the layer. A redirection and/or diffraction can be dependent upon the distance that an observer or object is from the luminance adjusting layer (as the angle of light redirection can play a role in determining how much light illuminates a surface a particular distance away from the layer. In some embodiments, the degree of diffraction (or light redirection) is set so that the variance in light is reduced at the desired illumination distance. Thus, for example, a residential flood light having LEDs can be configured for a desired illumination at 1 to 4 meters from the layer.

In some embodiments, a luminance adjusting layer is capable of reducing variation in light intensity from a light source over a surface area of about 100 $mm^2$ or more. For example, a luminance adjusting layer can reduce variation in light intensity from a light source over a surface area of about 10, 20, 30, 40, 50, 60, 70, 80, 90, 100, 150, 200, 250, 500, 1000, 2000, 3000, 4000, 5000, 10,000, 100,000 $mm^2$ or more (including any range above any one of the preceding values and any range defined between any two of the preceding values). In some embodiments, the luminance adjusting layer reduces variation in light intensity from a light source over a surface area of about 110 $mm^2$ to about 150 $mm^2$.

In some embodiments, the luminance adjusting layer can be provided on a substrate. In some embodiments, two or more luminance adjusting layers can be provided on a substrate. The two or more luminance adjusting layers can be provided on a same side of a substrate. The two or more luminance adjusting layers can be provided on opposite and/or different sides of a substrate.

A substrate can be composed of any suitable material. For example, the substrate can include one or more of glass, plastic, silicone, acrylic and acrylic-type polymers, polyester and polyester-type polymers, cellulose and cellulose-type polymers, styrene type polymers, polycarbonate type polymers, epoxy-based polymers, resins, and an organic layer or any combination or subcombination thereof. Examples of polyester type polymers, include but are not limited to, polyethylene terephthalate and polyethylenenaphthalate. Examples of cellulose type polymers include, but are not limited to, diacetyl cellulose and triacetyl cellulose. Examples of acrylics type polymers include, but are not limited to, poly methylmethacrylate. Examples of styrene type polymers, include but are not limited to, polystyrene and acrylonitrile-styrene copolymer (AS resin). In some embodiments, the substrate is a transparent electrode. In some embodiments, a protective layer can further be provided over the luminance adjusting layer.

In some embodiments, a luminance adjusting layer can act as a light diffusing layer for a diffusion lens or a light source. The light diffusing layer can be planar, approximately planar, partially planar, concave, partially concave, convex, or partially convex.

In some embodiments, the luminance adjusting layer can be, or be part of, a diffusion lens for, or part of, a light source including an adjustable light diffusing layer. In some embodiments, the diffusion lens includes an adjustable light diffusing layer that inversely adjusts its transmittance (and/or transmittance properties, for example, diffraction or directionality) with respect to the intensity of light impacting the light diffusing layer so that variations in luminance intensity of light passing through the layer are reduced. In some embodiments, the light diffusing layer of the diffusion lens reduces variations in the luminance intensity of light passing through a first portion and a second portion of the diffusion lens. The light diffusing layer of the diffusion lens can also reduce variations in the luminance intensity of light passing through the diffusion lens at a first and second time point.

The diffusion lens can further include a substrate under the light diffusing layer. Any of the substrates provided herein can be applied, as well as any other suitable substrate. A light diffusing layer can be provided on, for example, a diffusion lens, a light guide, a diffuser, a reflector, a liquid crystal display, an optical layer, a transparent conductive layer, a bulb of the light source, or a case of the light source. In some embodiments, the light diffusing layer is provided on a transparent electrode. In some embodiments, the diffusion lens further includes a protective layer over the light diffusing layer.

In some embodiments, a diffusion lens including an adjustable light diffusing layer can be provided between a light source and a viewer. In some embodiments, the diffusion lens can contact the light source. In other embodiments, the diffusion lens can be provided at a distance of about 1, 10, 20, 30, 40, 50, 60, 70, 80, 90, 100, 200, 300, 400, 500, 600, 700, 800, 900, 1,000, 2,000 mm or more from the surface of the light source.

Some embodiments provided herein relate to a diffusion lens including an adjustable light diffusing layer including two or more transparent electrodes and polymer-dispersed liquid crystals. In some embodiments, the transparent electrodes include indium tin oxide (ITO).

Figure 2A:
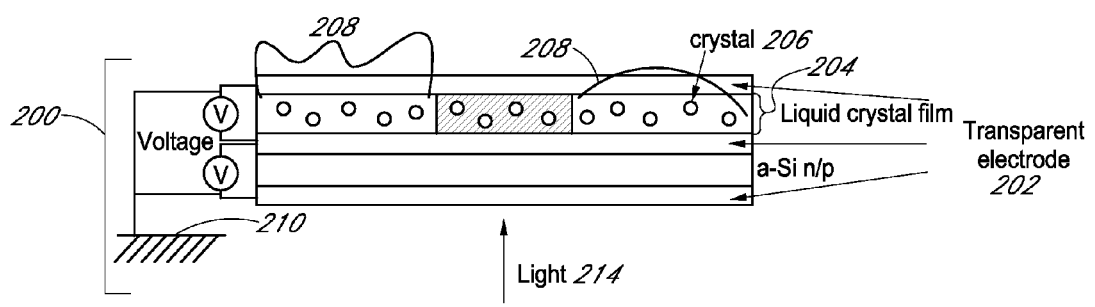
FIG. 2A is an illustration of some embodiments of a luminance adjusting layer including a liquid crystal layer between two transparent electrodes with voltage applied. The portion of the liquid crystal layer irradiated with light shows reduced transmittance.
Figure 2B:
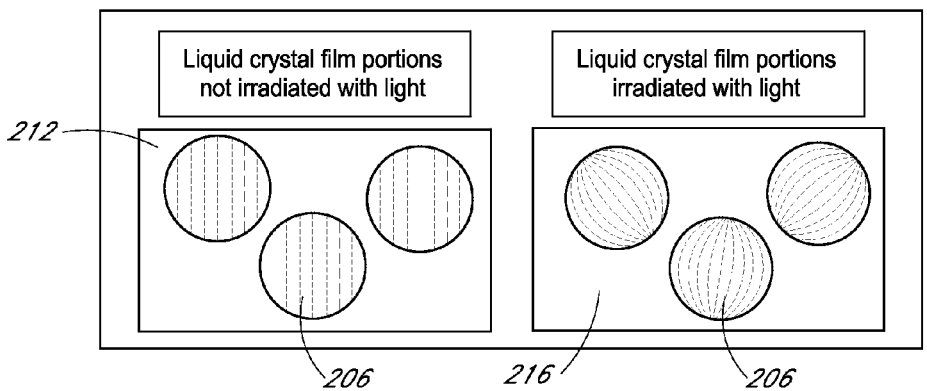
FIG. 2B is an illustration of the impact of light radiation on crystal alignment. Irradiation of the liquid crystal layer with light causes the crystals to misalign thereby altering transmittance to reduce light transmittance at a point adjacent to the altered area.

FIG. 2 depicts a luminance adjusting layer 200 that can be part of the above noted diffusion lens or other devices. In some embodiments, the luminance adjusting layer 200 includes three effectively transparent electrodes 202 and a liquid crystal layer 204 that includes suspended crystals 206. As shown on the left side of FIG. 2B and in section 208 of FIG. 2A, in the absence of high light irradiation 208, a voltage applied to the electrodes 202 from a voltage source 210 aligns the liquid crystals in the liquid crystal 206 as shown in the aligned crystals 212 (FIG. 2B). High light irradiation 214 results in a change in voltage across the electrodes (for example, between two or three of the electrodes) and then changes the alignment 216 of the crystals 206 (as shown on the right side of FIG. 2B), resulting in an area of altered transmittance 218 (FIG. 2A) in the luminance adjusting layer. In some embodiments, an instant light control sheet, such as a UMU layer, which changes from an opaque (diffusive) state to a transparent state by application of a voltage can be employed as a luminance adjusting layer.

As will be appreciated by those of skill in the art, in light of the present disclosure, the separation between "high intensity" light and "low intensity light" is one that is customizable to the maker and/or user of the device and/or methods. While the division can be set as desired, in some embodiments a difference between the two categories will be set so as to reduce and/or eliminate apparent lighting differences as the light passes through the substrate. In some embodiments, the difference between a high intensity and a low intensity (($I_v$ Point A–$I_v$ Point B)/100, where $I_v$ Point A>$I_v$ Point B) will be at least 0.1, 1, 10, 100, 1000, 10,000, 100,000, 1,000,000% or more.

In some embodiments, the diffusion lens can include an adjustable light diffusing layer including two or more transparent electrodes and an electrochromatic layer. In some embodiments, the transparent electrodes include indium tin oxide (ITO). The electrochromatic layer can include one or more of: type I electrochromic materials, for example, molecular dyes; type II electrochromic materials; and type III electrochromic materials, for example, metal oxides and conducting polymers. The electrochromatic materials can be organic or inorganic.

Figure 4:
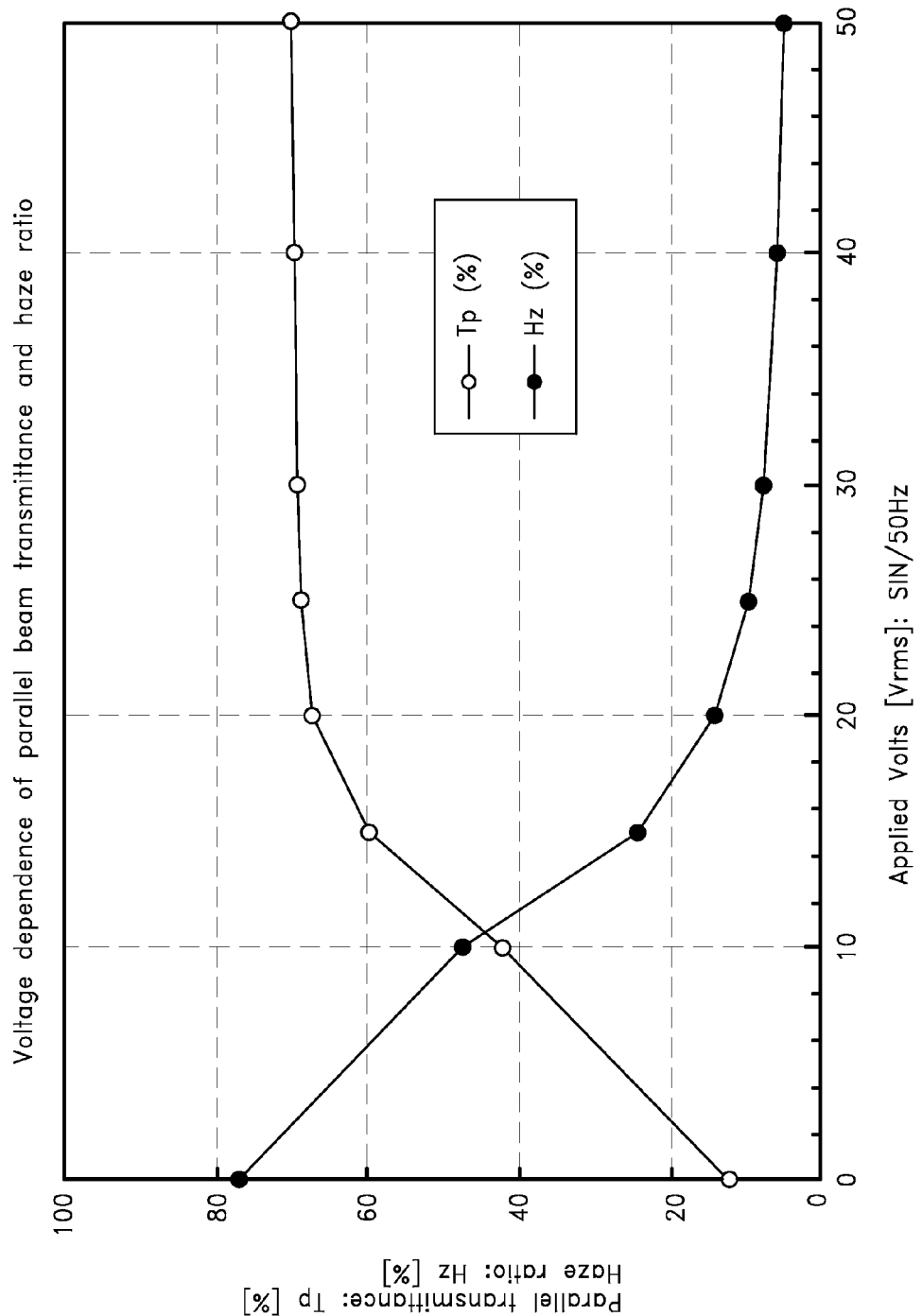
FIG. 4 shows a graph depicting the range of voltage dependence of parallel beam transmittance and haze ratio for some embodiments. Applied volts (Vrms) is plotted on the X axis. The % parallel transmittance Tp is denoted by open circles and % haze ratio Hz is denoted by closed circles.

In some embodiments as shown in FIG. 3, a luminance adjusting layer 300 includes a liquid crystal layer 302 provided between two transparent conductive layers 304, each layer including an electrode 306. Placement of the electrodes 306 controls the direction in which electrons flow through the liquid crystal layer 302. In the absence of a voltage 308, the liquid crystal molecules are not aligned and light traveling through the luminance adjusting layer is refracted randomly resulting in reduced transmittance/opacity 314 of the luminance adjusting layer, as shown in the opaque embodiment 310. When a voltage is applied 318, the liquid crystal molecules within the suspended liquid crystal capsules 320 align in the direction of electron flow, allowing light traveling with the direction of alignment to pass through the luminance adjusting layer with high transmittance 322, as shown in the transparent arrangement 316. FIG. 4, is a graph illustrating some embodiments of a relationship between the voltage dependence of parallel transmittance and haze ratio.

Figure 5:
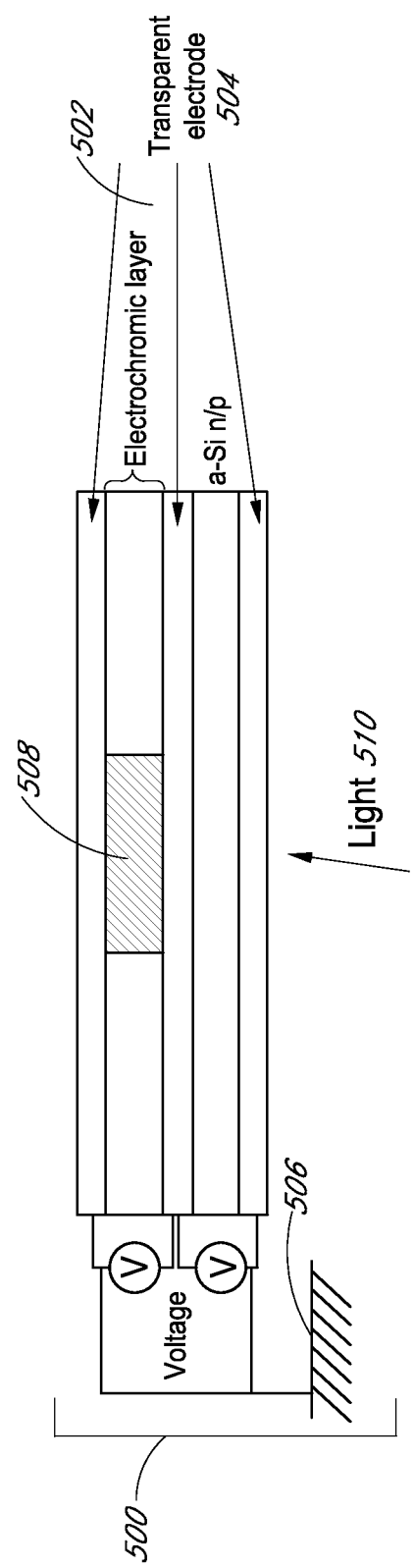
FIG. 5 shows an illustration of some embodiments of a luminance adjusting layer including an electrochromatic layer between two transparent electrodes having a voltage source. The portion of the luminance adjusting layer irradiated with light shows reduced transmittance.

In some embodiments as shown in FIG. 5, a luminance adjusting layer 500 includes an electrochromatic layer 502 between two transparent electrodes 504 having a voltage source 506. Transmittance can be reduced in the portion of the luminance adjusting layer 508 irradiated with light 510.

Figure 6A:
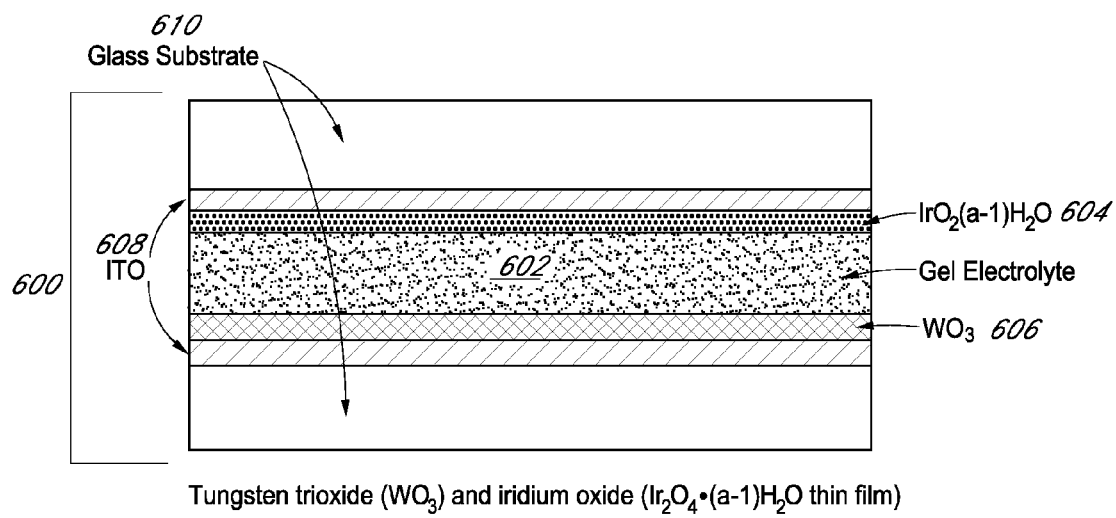
FIG. 6A shows an illustration of some embodiments of a Tungsten trioxide ($WO_3$) and iridium oxide ($Ir_2O_4(a-1)H_2O$) thin layer luminance adjusting layer.
Figure 6B:
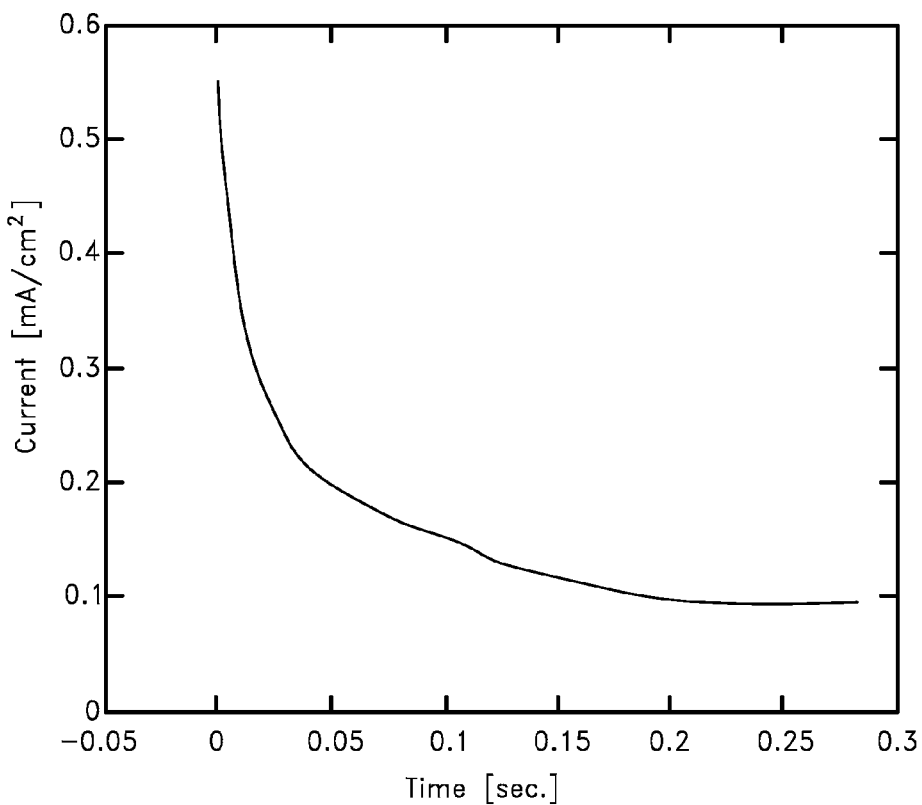
FIG. 6B is a graph of current ($mA/cm^2$) vs. time (sec.).
Figure 6C:
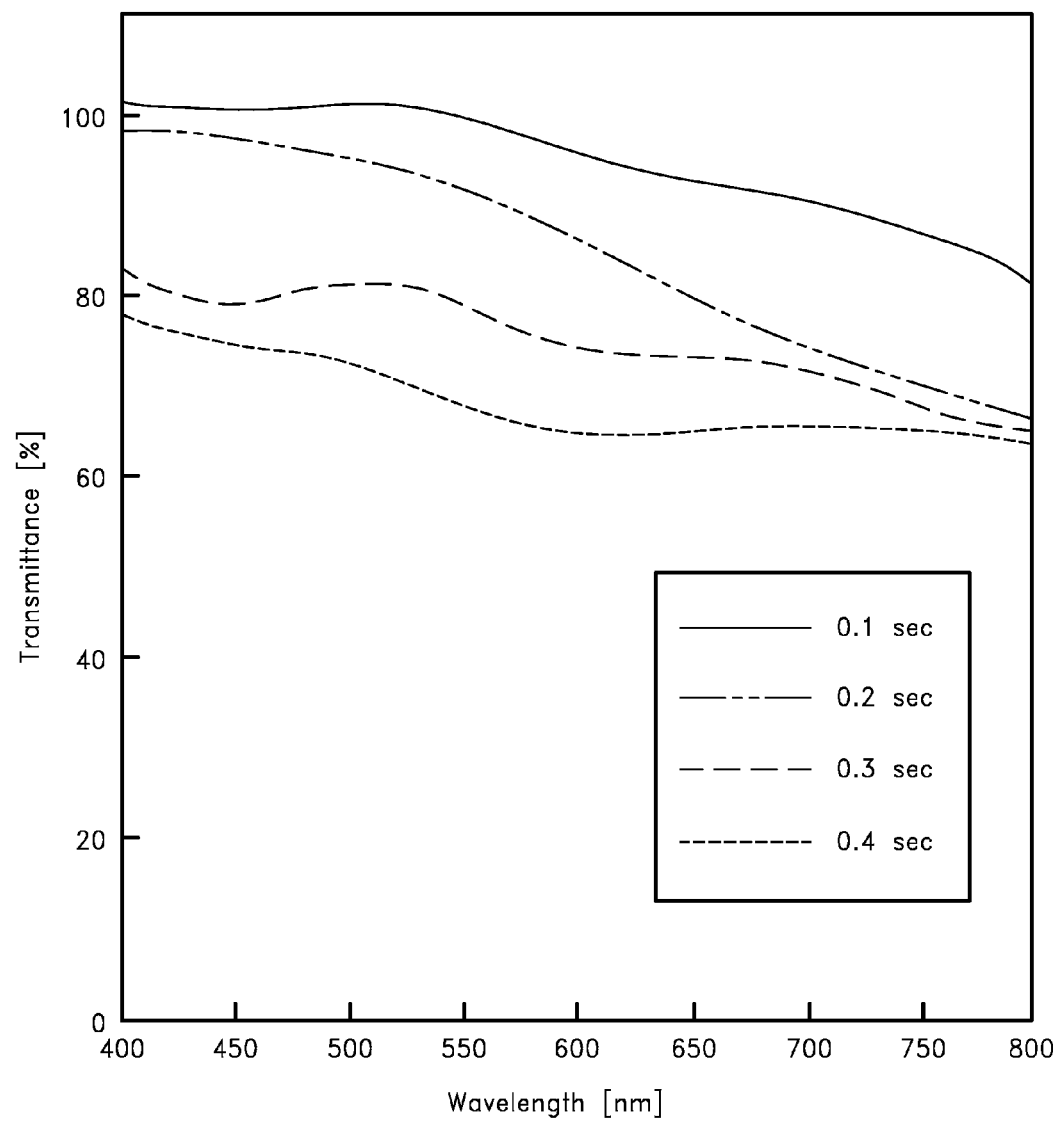
FIG. 6C is a graph comparing transmittance % to wavelength.

In some embodiments as shown in FIGS. 6A-6C, a luminance adjusting layer 600 includes a gel electrolyte layer 602 between a IrO$_2$(a–1)H$_2$O layer 604 and a WO$_3$ layer 606, at least two ITO layers 608 and at least two outer glass substrate layers 610. FIG. 6B is a graph of current (mA/cm$^2$) vs. time (sec.) for some embodiments of such a layer. FIG. 6C is a graph comparing the parameters of transmittance % to wavelength of some embodiments of such a layer.

Figure 7:
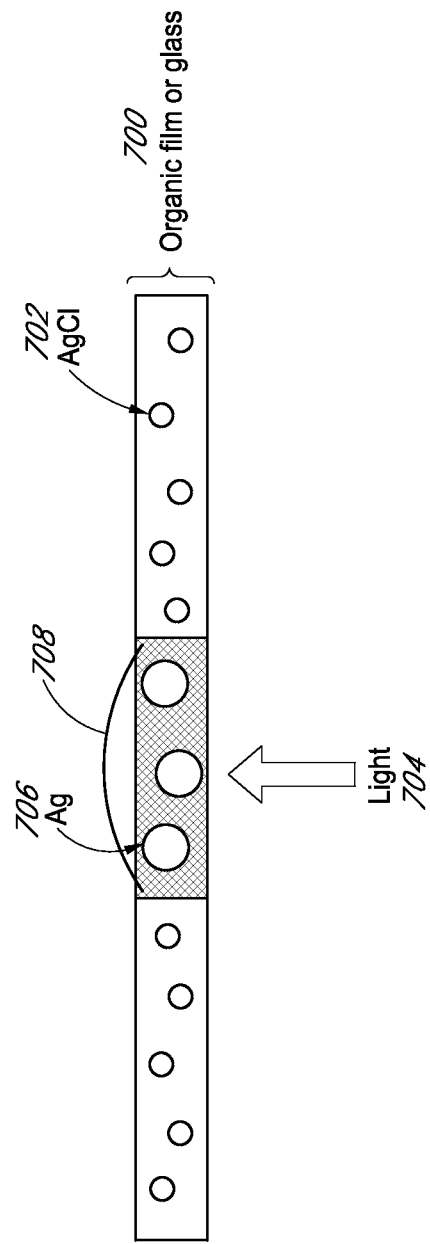
FIG. 7 shows an illustration of some embodiments of an organic layer or glass luminance adjusting layer that includes AgCl.

As shown in FIG. 7, in some embodiments, an organic layer or glass luminance adjusting layer 700 includes AgCl. In areas of low luminous intensity the AgCl will exist as AgCl 702. However, light irradiation 704 releases silver 706 resulting in a reduction in transmittance at a part of the layer 708. In some embodiments, the luminance adjusting layer includes a photochromatic film and/or layer including a silver halide.

In some embodiments, the diffusion lens can include an adjustable light diffusing layer that includes a photochromatic film and/or layer. In some embodiments, the luminance adjusting layer includes a photochromatic film and/or layer including one or more layers that include a photochromatic pigment.

Figure 8A:
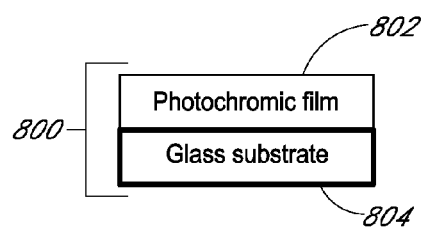
FIG. 8A shows an illustration of some embodiments of a luminance adjusting layer including a photochromic layer provided on a glass substrate.
Figure 8B:
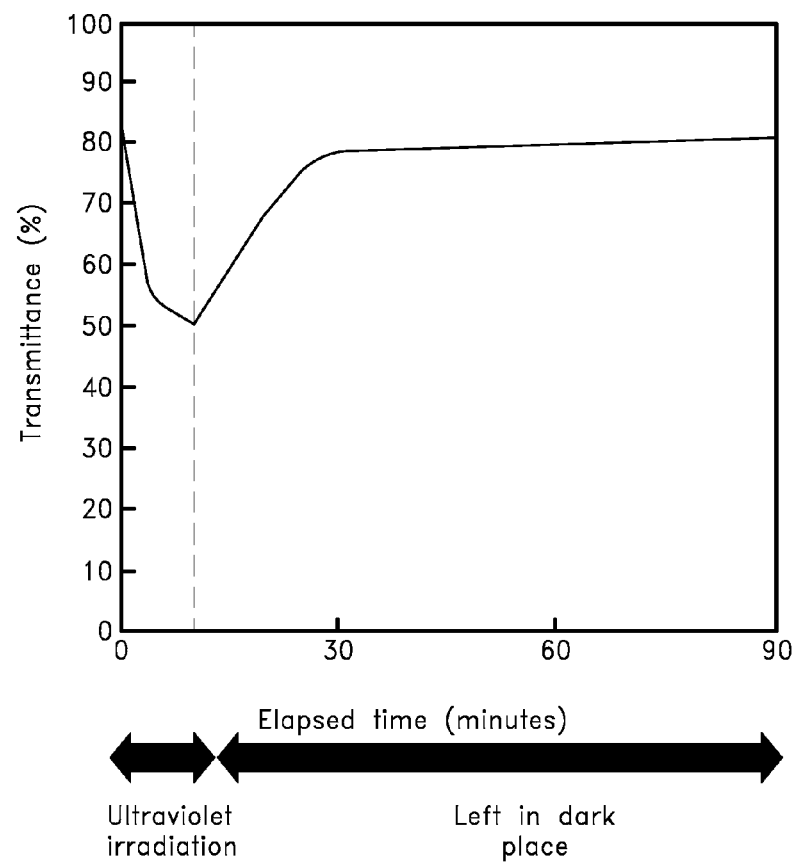
FIG. 8B is a graph of transmittance (%) over time showing time required to recover transmittance after UV irradiation of the luminance adjusting layer of 8A.

In some embodiments as shown in FIGS. 8A and 8B, a luminance adjusting layer 900 includes a photographic layer 902 provided on a glass substrate 904. The photographic layer can include a microcrystalline silver halide, as the photochromic material, a silicon oxide, a glass matrix component for dispersing microcrystalline silver halide, and copper as a sensitizer for promoting coloration or decoloration of photochromic layer. FIG. 8B depicts an exemplary relationship of degree of transmittance (%) over time of exposure to UV radiation, and then the recovery of the system when left in the dark. In some embodiments, one can use a progressive optical lens, for example as manufactured by Tokai/Nikon for the light adjusting layer. In some embodiments, this can include a lens substrate, with a photochromatic coating over it, with an optional hard coating over it, with and optional multicoating over it, with and optional pro-guard coating over it. In some embodiments, the transition, when exposed to light can be between clear and brown or clear and gray.

Figure 9:
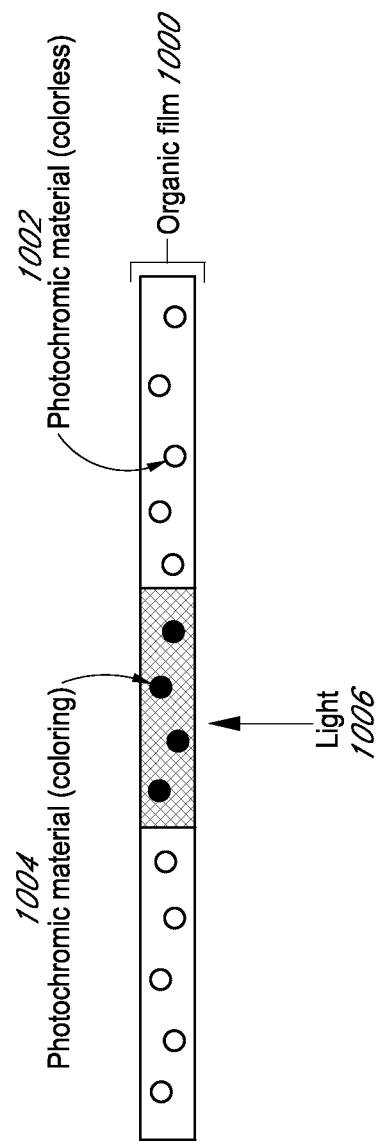
FIG. 9 shows an illustration of some embodiments of a luminance adjusting layer including photochromic material suspended in an organic layer.

In some embodiments as shown in FIG. 9, a luminance adjusting layer includes an organic layer 1000 including a colorless photochromic material 1,002 that darkens upon exposure to light 1006. In some embodiments, any photochromic material can be used. In some embodiments, chromene 1 can be employed, see Formula I:

Formula I

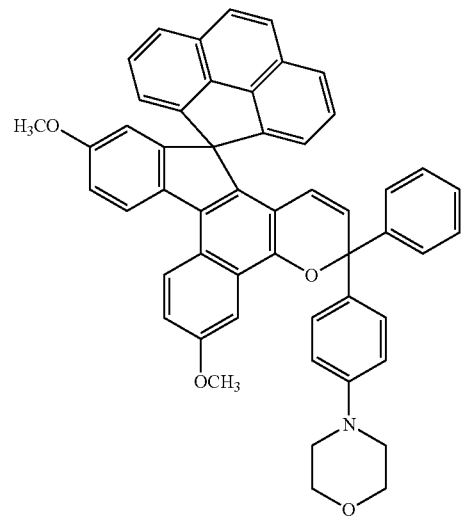

Figure 11A:
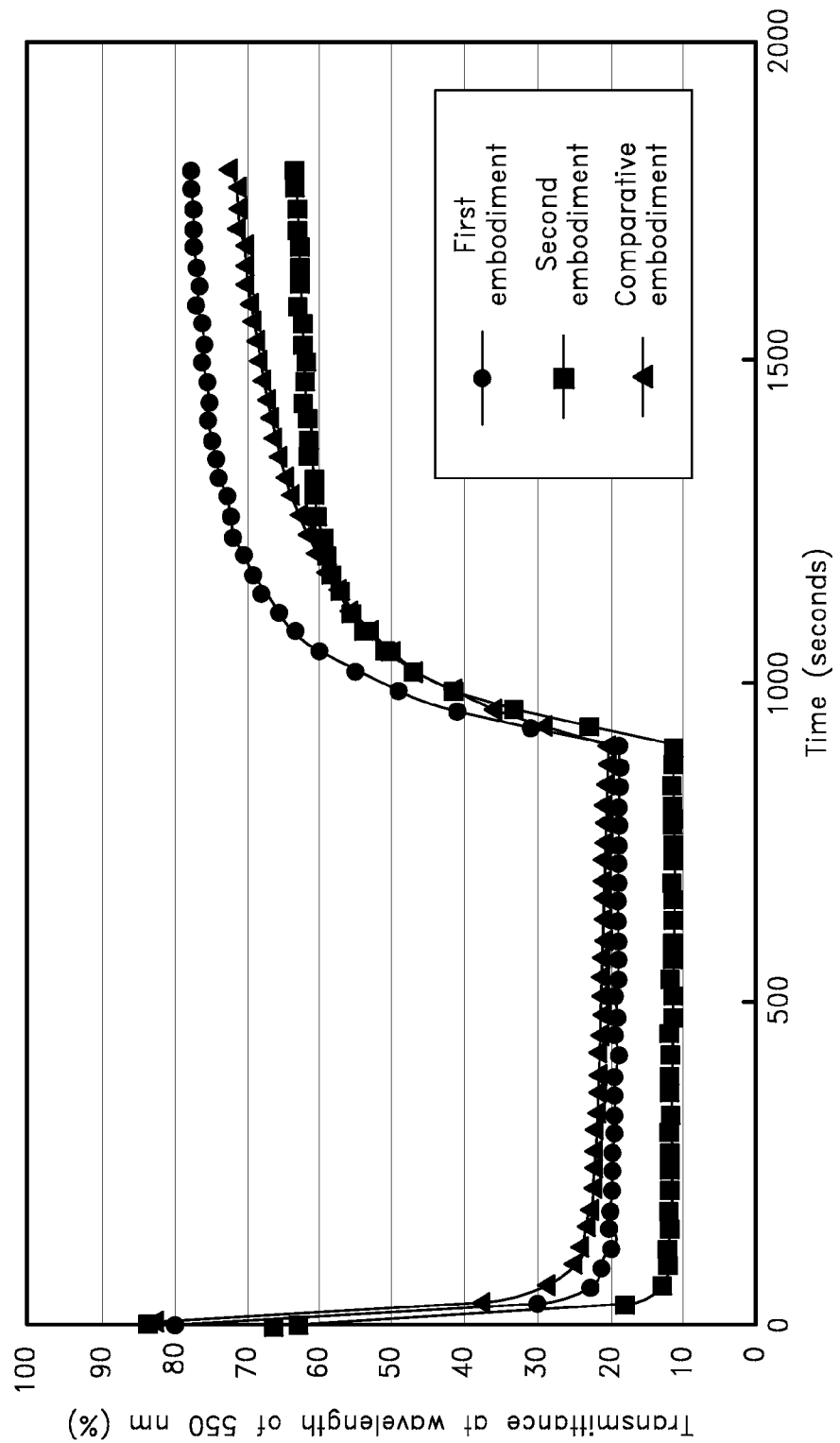
FIG. 11A is a graph of transmittance over time for three embodiments of FIG. 11.
Figure 11B:
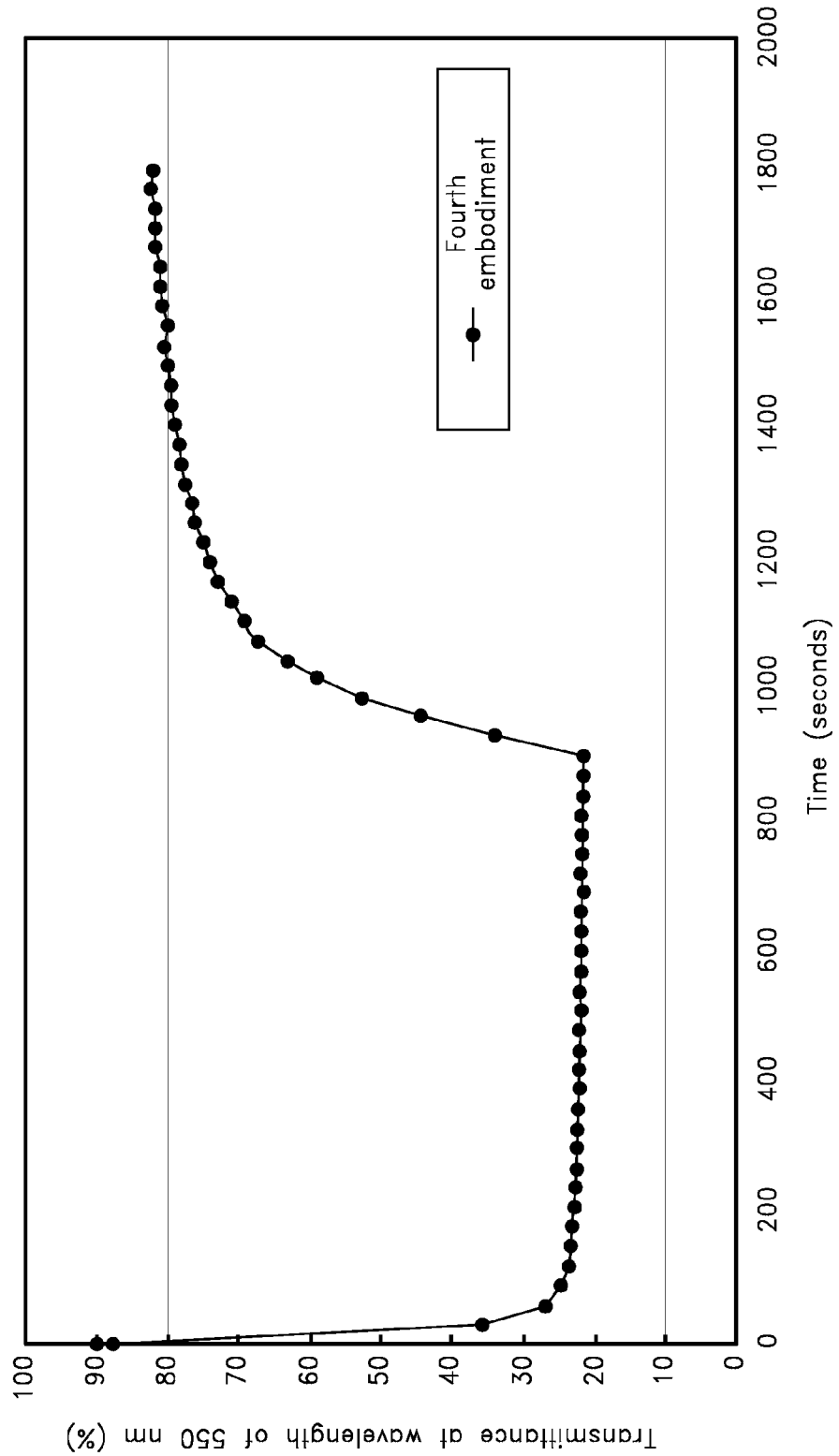
FIG. 11B is a graph of transmittance over time for a fourth embodiment of FIG. 10.

FIG. 10 depicts some embodiments of various photochromic layers and/or layers. While the thickness of the layer can be varied depending upon the use, in some embodiments, the thickness is between 10 and 100 microns, for example 20, 30, 40, 50, 60, 70, 80, 90, 100, 500, or 1000 microns, including any range defined between any two of the preceding values. In some embodiments, only the photochromic material need be present on the substrate. In other embodiments, additional layers, such as anti-reflective layers and/or hard coatings can be present. While the properties of any given embodiment can vary depending upon the desired application and specifics of the materials used, FIGS. 11A and 11B provide graphs of the transmittance of 550 nm wavelength light over time for each of the arrangements outlined in FIG. 10.

In some embodiments, any of the luminance adjusting layers can be employed in a diffusion lens that can be configured for reducing luminance variation in a planar lighting device including one or more light emitting diodes (LEDs) (and/or other aspects relating to LEDs, such as a diffuser, light guide panel, and/or reflector), such that substantially uniform illumination is achieved across the surface of the planar lighting device. In some embodiments, the planar lighting device includes at least 1, 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1,000 or more LEDs. In some embodiments, the LEDs of the planar lighting device are spaced at a distance of about 100, 200, 300, 400, 500 mm or more apart.

Some embodiments provided herein relate to a method of modulating luminous intensity of light from a light source. The method can include providing at least one light source, providing a luminance adjusting layer interposed between a viewer and the at least one light source, and adjusting a transmittance of the luminance adjusting layer in accordance with a luminous intensity of light from the at least one light source. The adjustment can be one such that transmittance through the luminance adjusting layer varies inversely with luminous intensity.

In some embodiments, the adjustment of transmittance can be such that less light passes through the layer. In some embodiments, the adjustment of transmittance can be such that the properties of the light being transmitted through the layer is different, for example, light in one section (where the intensity is to be reduced) can be diffracted or redirected (see for example, FIG. 3B, left side), such that less light is present on the opposite side of the light source, at some distance from the layer. Thus, in some embodiments, the altered transmittance can be achieved by reducing the light passing through one area and/or redirecting and/or diffracting light passing through one area of the layer (which can have the added benefit of increasing the amount of light directed to other sections). In embodiments in which light is redirected and/or diffracted as it passes through the luminance adjusting layer, the low luminance intensity areas 110 (FIG. 1) that surround the high luminance intensity areas can benefit from light being diffracted from the high luminance intensity areas 108, as such additional light can further "bring up" the trough section 104, to further normalize the final light from the device 112. As will be appreciated by one of skill in the art, such a method of redirecting light from the high intensity areas to the low intensity areas can have a distance dependent aspect to it in some situations as whether or not the angle of light leaving the high luminance intensity areas 108 will precisely match up with light from a low luminance intensity area 110, can depend upon the angle of light redirection and how far away the viewer or item to be illuminated is. Thus, in some embodiments, the number and shape of the high luminance intensity areas and degree of redirection can be customized for a particular viewing and/or use distance, for example 1 cm to 100 cm, 100 cm to 1 meter, 1 meter to 4 meters, 4 meters to 10 meters, 10 meters to 100 meters, etc. In some embodiments, no customization is required.

In some embodiments, the luminance adjusting layer reduces a difference in the luminous intensity of light reaching the viewer from a first portion and a second portion of the light source. In some embodiments, the luminance adjusting layer reduces a difference in the luminous intensity of light reaching the viewer at a first time point and at a second time point.

In some embodiments, a method of modulating luminous intensity of light from a light source is provided. The method can include, providing at least one light source; providing a luminance adjusting layer interposed between a viewer and the at least one light source, and directing light from the light source to the luminance adjusting layer such that transmittance from the luminance adjusting layer varies inversely with luminous intensity.

As used herein, the phrase "transmittance from the luminance adjusting layer" encompasses the situation where the absolute amount of light that passes out of the layer is less than the amount of light that enters the layer. The phrase "transmittance from the luminance adjusting layer" also encompasses the situation where the absolute amount of light that passes out of the layer is not necessarily different from the amount of light that enters the layer, but where a property of the light has changed such that peaks and troughs of the light leaving the layer appears reduced. This can be achieved in a number of ways, for example, as shown in FIG. 3B (left side) because the light is being redirected as it passes through the layer, the amount of light directly across the layer from where the light impinges on the layer can be effectively reduced, at some distance from the layer. As will be appreciated by one of skill in the art, while the luminance intensity of light immediately at the exiting surface of the light adjusting layer might not be reduced, or only be very minimally reduced, an effective reduction in the luminance intensity will be achieved at some distance from the surface, as the redirected light has an opportunity to travel further away from the light adjusting layer. Consistent with the above, the phrase "transmittance of the luminance adjusting layer varies inversely with luminous intensity" encompasses both of the above noted options. In particular, a transmittance of the luminance adjusting layer will vary inversely with luminous intensity when less light passes through brighter sections of the luminous adjusting layer. Furthermore, a transmittance of the luminance adjusting layer will vary inversely with luminous intensity when the same amount of light passes through a section of the layer, but the light in that section is redirected so that it is dispersed upon leaving the layer and thereby redirected out of what would have otherwise been the brighter area (see for example, FIG. 3B). This manipulation of the light can effectively result in a decrease in an apparent luminance intensity of the relevant section of the layer (or from the light source) the further one is from the layer (or light source). As used herein, the terms "film" and "layer" are interchangeable. A layer can, but need not, be placed on a substrate. A layer can coat some to all of a substrate, for example, anywhere from 0.01 to 100% of a substrate can be coated with a layer.

Some embodiments provided herein provide a method of modulating luminous intensity of light from a light source by providing at least one light source and providing a luminance adjusting layer. The luminance adjusting layer can include at least one of: polymer-dispersed liquid crystals (PDLCs), electrochromatic materials, and/or photochromic materials, interposed between a viewer and the at least one light source.

The method can further include adjusting a transmittance (for example, absolute transmittance and/or direction of transmittance) of the luminance adjusting layer inversely with a luminous intensity of light from the light source. This can result in a transmittance of light from the luminance adjusting layer that varies inversely with luminous intensity. In some embodiments, the transmittance of the luminance adjusting layer is adjusted by applying a voltage to the luminance adjusting layer (see, for example, FIG. 3A). In some embodiments, the transmittance of the luminance adjusting layer is adjusted during operation of a viewable device.

Some embodiments provided herein provide a method of modulating luminous intensity of light from a light source. This can include providing at least one light source and providing a luminance adjusting layer, which includes two or more transparent electrodes and a liquid crystal layer including polymer-dispersed liquid crystals, interposed between a viewer and the at least one light source. One can further adjust the transmittance of the luminance adjusting layer in accordance with a luminous intensity of light from the at least one light source by applying a voltage to the luminance adjusting layer, such that transmittance of the luminance adjusting layer varies inversely with luminous intensity. In some embodiments, the transmittance of the luminance adjusting layer is adjusted during operation of a viewable device.

Some embodiments provided herein provide a method of modulating luminous intensity of light from a light source. This can include providing at least one light source and providing a luminance adjusting layer, which includes two or more transparent electrodes and an electrochromatic layer, interposed between a viewer and the at least one light source, and, adjusting a transmittance of the luminance adjusting layer in accordance with a luminous intensity of light from the at least one light source by applying a voltage to the luminance adjusting layer, such that transmittance of the luminance adjusting layer varies inversely with luminous intensity. In some embodiments, the transmittance of the luminance adjusting layer is adjusted during operation of a viewable device.

Some embodiments provided herein provide a method of modulating luminous intensity of light from a light source. The method can include providing at least one light source and providing a luminance adjusting layer, which includes a photochromatic layer included of one or more layers including silver halide or a photochromatic pigment, interposed between a viewer and the at least one light source. One can further adjust the transmittance of the luminance adjusting layer in accordance with a luminous intensity of light from the at least one light source by altering the absorbance of the luminance adjusting layer, such that transmittance of the luminance adjusting layer varies inversely with luminous intensity. In some embodiments, the transmittance of the luminance adjusting layer is adjusted during operation of a viewable device.

In some embodiments, a light source is provided. The light source can include a substrate and a light diffusing layer that is configured to adjust light transmittance through the layer in accordance with luminous intensity so as to reduce differences in the luminous intensity of light exiting the light source. In some embodiments, the substrate of the light source can be planar, partially planar, substantially planar, convex, concave, hemispherical, spherical, hemiovoid, ovoid, cuboid, cylindrical, or amorphous. In some embodiments, the light diffusing layer of the light source is on top of a surface of the substrate. In some embodiments, the light diffusing layer of the light source is underneath the substrate. In some embodiments, the light diffusing layer is within the substrate. In some embodiments, the light diffusing layer is on top of the surface of the light source. In some embodiments, the light diffusing layer is on an inner surface of the light source. In some embodiments, the light diffusing layer is on an outer surface of the light source.

In some embodiments, the light source includes two or more sources of light. The light source can include, for example, 2, 3, 4, 5, 6, 7, 8, 9, 10, 11, 12, 13, 14, 15, 16, 17, 18, 19, 20, 30, 40, 50, 60, 70, 80, 90, 100, 150, 200, 250, 300, 350, 400, 450, 500, 550, 600, 650, 700, 750, 800, 850, 900, 950, 1,000 or more sources of light. In some embodiments, the light source includes a LED. In some embodiments, the LED includes one or more of a diffuser, light guide panel, reflector, etc., in optical communication with it and the layer is on, under, and/or part of the diffuser, light guide panel, and/or reflector. Examples of point sources of light include, but are not limited to, filaments, incandescent bulbs, tungsten-halogen incandescent bulbs, xenon bulbs, fluorescent bulbs, compact fluorescent bulbs, T8 bulbs, high intensity discharge bulbs, and light emitting diodes (LEDs). In some embodiments, the light source includes one or more LEDs.

In some embodiments, the light source can be larger than about 10 $mm^2$, for example, 10, 50, 100, 200, 300, 400, 500, 1000, or 10,000 $mm^2$. In some embodiments of the light source, the light source can be larger than about 1 $cm^2$, for example, 1, 10, 100 $cm^2$ or larger. A surface of the light source can be of any suitable material. For example, a surface of the light source can include at least one of glass, plastic, acrylic, polyester, silicon, and/or an organic layer.

In some embodiments, the light source includes a substrate and a light diffusing layer, which includes one or more of the following: a polymer-dispersed liquid crystal (PDLC), an electrochromatic material, and/or a photochromic material, that is configured to adjust light transmittance through the layer in accordance with luminous intensity so as to reduce differences in the luminous intensity of light exiting the light source.

In some embodiments, the light source includes a substrate and a light diffusing layer, which includes a photochromatic layer included of one or more layers including at least one of a silver halide or a photochromatic pigment, that is configured to adjust light transmittance through the layer in accordance with luminous intensity so as to reduce differences in the luminous intensity of light exiting the light source.

In some embodiments, the light source includes a substrate and a light diffusing layer, which includes two or more transparent electrodes and a liquid crystal layer including polymer-dispersed liquid crystals, that is configured to adjust light transmittance through the layer in accordance with luminous intensity so as to reduce differences in the luminous intensity of light exiting the light source.

In some embodiments, the light source includes a substrate and a light diffusing layer, which includes two or more transparent electrodes and an electrochromatic layer. This is configured to adjust light transmittance through the layer in accordance with luminous intensity so as to reduce differences in the luminous intensity of light exiting the light source.

EXAMPLE 1

Liquid Crystal Layers

A luminance adjusting layer as shown in FIG. 2 is provided. Voltage at 20 Vrms is applied to the electrodes of the luminance adjusting layer thereby aligning the liquid crystals of the liquid crystal layer parallel to the light source resulting in high transmittance. In a portion of the luminance adjusting layer receiving high luminous intensity, the voltage is reduced to 15 Vrms resulting in reduced parallel transmittance. This provides a more even illumination an object on the opposite side of the luminance adjusting layer from the light source.

EXAMPLE 2

Electrochromic Layers

A luminance adjusting layer as shown in FIG. 5 is provided, where the electrochromic material is a conductive polymer. Current is applied to the electrodes of the luminance adjusting layer. In a portion of the luminance adjusting layer receiving high luminous intensity, parallel transmittance is reduced by altering the current. This results in a more even illumination of an object on the opposite side of the luminance adjusting layer from the light source.

EXAMPLE 3

Silver Chloride Layers

A luminance adjusting layer as shown in FIG. 7 is provided. In a portion of the luminance adjusting layer receiving high luminous intensity, AgCl suspended in the organic layer of the luminance adjusting layer is converted to Ag which results in reduced transmittance in the areas of highest luminous intensity. This selective reduction in transmittance results in a more even light field as the light leaves the luminance adjusting layer.

EXAMPLE 4

Photochromic Material

A luminance adjusting layer as shown in FIG. 9 is provided in front of a LED. The photochromic material includes Chromene 1. In a portion of the luminance adjusting layer receiving high luminous intensity, photochromic material suspended in the organic layer of the luminance adjusting layer darkens and reduces transmittance. Over time, the intensity of the light impinging upon the portion of the luminance adjusting layer decreases as the intensity of the LED gradually decreases. As the intensity of light decreases over time, less of the photochromic material is impacted by the light, thereby allowing more light to pass through the layer, and thereby maintaining uniform luminous intensity of an LED over time.

EXAMPLE 5

Photochromic Characterizations and Embodiments

The present example outlines a variety of photochromic options and some their optical characteristics.

A photochromic material (diarylethene photochromic compound (1,2-bis(2-methyl-5-phenyl-3-thienyl)-3,3,4,4,5,5,-hexafluorocyclopentene) as outlined in Table 1) is laminated onto a substrate. The photochromic pigment encapsulating a diarylethene photochromic compound and an aromatic compound and an ester compound having a melting point or a softening point lower than or equal to 40° C. and a boiling point higher than or equal to 200° C. are employed (see Table 1). This provides a luminance adjusting layer.

TABLE 1

|  |  | Photochromic compound | Automatic compound/ester compound | Additive |
|---|---|---|---|---|
| Embodiments | 1. | Compound A (1) | Piccolastic A5 (Rika Hercules) (50) |  |
|  | 2. | Compound B (1) | Piccolastic A5 (Rika Hercules) (50) |  |
|  | 3. | Compound C (1) | Piccolastic A5 (Rika Hercules) (50) |  |
|  | 4. | Compound C (1) | Butyl stearate (50) |  |
|  | 5. | Compound B (1) | Butyl stearate (50) |  |
|  | 6. | Compound B (1) | Butyl stearate (45) | Irganox 1076 (Ciba Specialty Chemicals (5) |
|  | 7. | Compound C (1) | Piccolastic A5 (Rika Hercules) (45) | Irganox 1035 (Ciba Specialty Chemicals (5) |
|  | 8. | Compound C (1) | Piccolastic A5 (Rika Hercules) (45) | Irganox 259 (Ciba Specialty Chemicals (5) |
|  | 9. | Compound C (1) | Piccolastic A5 (Rika Hercules) (45) | Irganox 3114 (Ciba Specialty Chemicals (5) |
|  | 10. | Compound C (1) | Piccolastic A5 (Rika Hercules) (45) | Irganox 1520 (Ciba Specialty Chemicals (5) |
|  | 11. | Compound C (1) | Piccolastic A5 (Rika Hercules) (45) | 1,1-bis(4-hydroxyphenyl)decane (5) |
|  | 12. | Compound C (1) | Piccolastic A5 (Rika Hercules) (45) | Irganox 1222 (Ciba Specialty Chemicals (5) |
|  | 13. | Compound B (1) | Piccolastic A5 (Rika Hercules) (45) | Irganox 1035 (Ciba Specialty Chemicals (5) |
| Comparative examples | 1. | Compound B (1) | 25% styrene resin toluene solution (100) |  |
|  | 2. | Compound A (1) | 50% acrylic resin toluene solution (50) |  |
|  | 3. | Compound B (1) | 50% acrylic resin toluene solution (50) |  |
|  | 4. | Compound C (1) | 50% acrylic resin toluene solution (50) |  |
|  | 5. | Compound A (1) | Piccolastic A5 (Rika Hercules) (45) |  |
|  | 6. | Compound C (1) | n-octadecane (50) |  |
|  | 7. | Compound C (1) | 50% acrylic resin toluene solution (50) |  |
|  | 8. | Compound C (1) | Piccolastic A5 (Rika Hercules) (45) | Sanol LS-765 (Sankyo) (5) |

Compound A: Diarylethene photochromic compound (1,2-bis(2-methyl-5-phenyl-3-thienyl)-3,3,4,4,5,5,-hexafluorocyclopentene)
Piccolastic A5: Styrene-α-methylstyrene copolymer (having a weight-average molecular mass of 317)

Figure 11C:
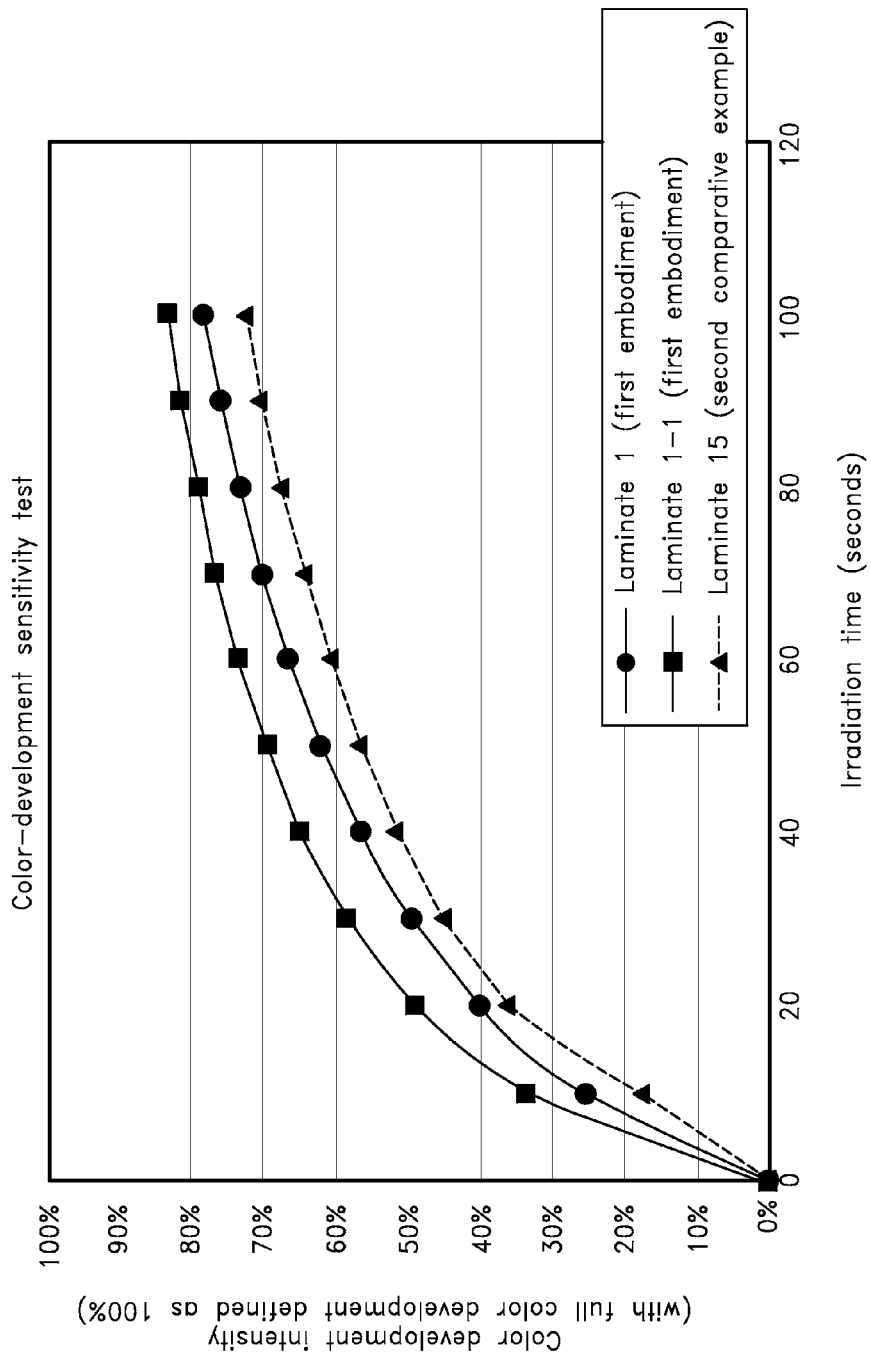
FIG. 11C is a graph that shows exemplary parameters for a color-development sensitivity test in a graph of color development intensity over time of irradiation.

A color-development sensitivity test can be performed on the resulting layer. Using a bulb-shaped fluorescent lamp (product name: Neoball 5 blacklight EFD 15 BLB) manufactured by Toshiba Lighting & Technology Corporation, the layer can be placed at a position with an intensity of 530 μW/cm$^2$, the Y value of the color-development intensity can be measured at regular time intervals using Model TC-3600 manufactured by Tokyo Denshoku Co., Ltd., and the Y values were converted into brightness values. See FIG. 11C for predicted characteristics.

Figure 11D:
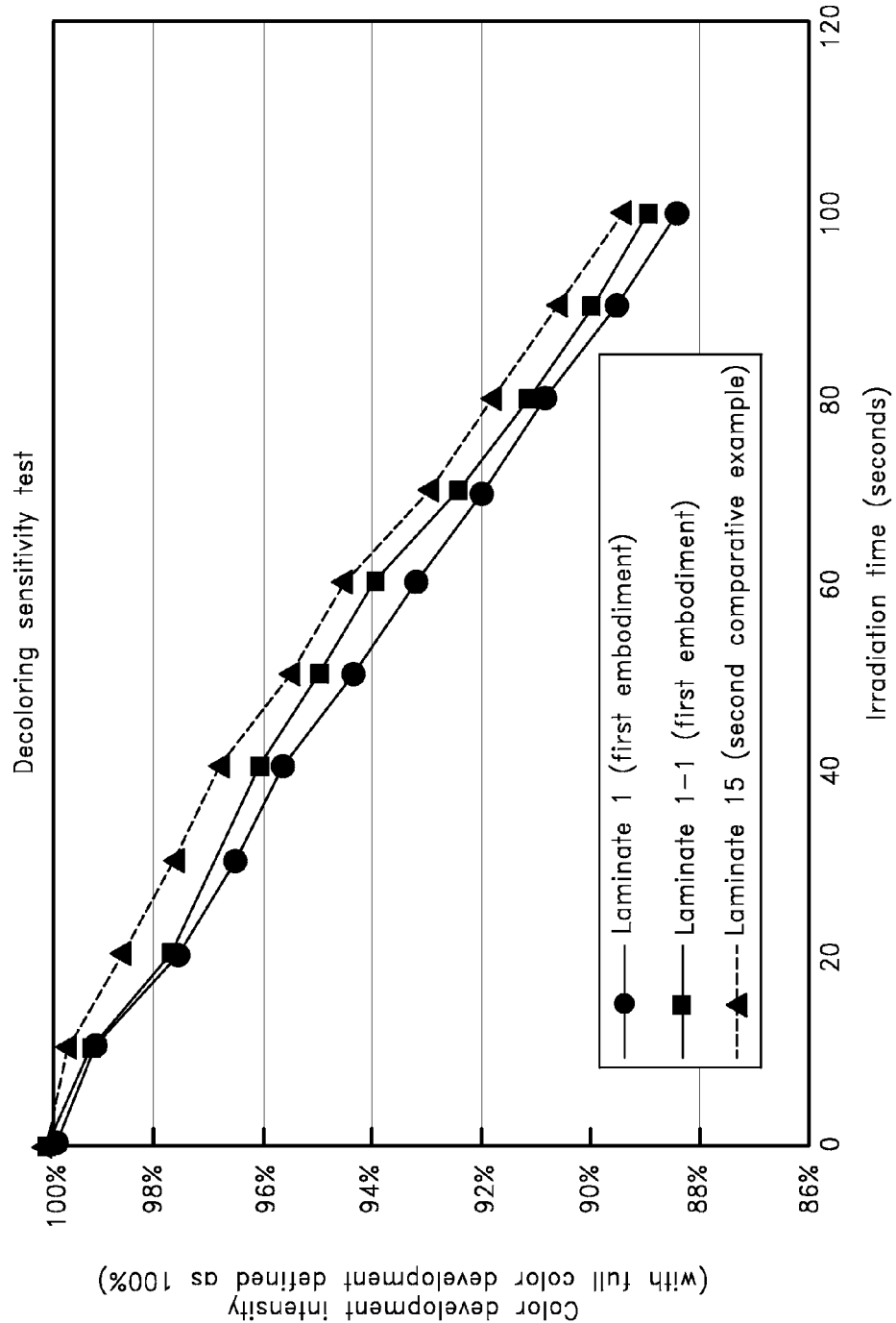
FIG. 11D is a graph that shows the exemplary parameters for a decoloring sensitivity test in a graph of color development intensity over time of irradiation.

A decoloring sensitivity test can also be performed on the resulting layer. The layer that has fully developed colors as a result of ultraviolet irradiation can be irradiated under 4600 Lux using a lamp (Toshiba Neohalogen Mini J12V2020W-AXS) installed in a color difference meter (Model TC-3600 manufactured by Tokyo Denshoku Co., Ltd.), the Y value of the decoloring intensity can be measured at regular time intervals using Model TC-3600 manufactured by Tokyo Denshoku Co., Ltd., and the Y values can be converted into brightness values. See FIG. 11D for anticipated characteristics.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A diffusion lens for a light source, the lens comprising an adjustable light diffusing layer, wherein the adjustable light diffusing layer is configured so that transmittance properties of the adjustable light diffusing layer can be variably adjusted during operation of a viewable device, such that transmittance through the adjustable light diffusing layer varies inversely with respect to an intensity of light impacting the adjustable light diffusing layer so that luminance variation is reduced over the surface of the lens.

2. The diffusion lens of claim 1, wherein the light source comprises one or more light emitting diodes (LEDs).

3. The diffusion lens of claim 1, wherein the light diffusing layer comprises one or more of the following: polymer-dispersed liquid crystals (PDLCs), electrochromatic materials, and photochromic materials.

4. The diffusion lens of claim 1, wherein the light diffusing layer is on at least one of a light guide, a diffuser, a reflector, a liquid crystal display, an optical layer, a transparent conductive layer, a bulb of the light source, or a case of the light source.

5. The diffusion lens of claim 1, further comprising a substrate under the light diffusing layer, wherein the substrate comprises at least one of glass, plastic, acrylic, polyester, or an organic layer.

6. The diffusion lens of claim 1, wherein a surface area of the light diffusing layer is greater than 150 mm$^2$.

7. The diffusion lens of claim 1, wherein the light diffusing layer comprises two or more transparent electrodes and polymer-dispersed liquid crystals.

8. The diffusion lens of claim 1, wherein the light diffusing layer comprises two or more transparent electrodes and an electrochromatic layer.

9. The diffusion lens of claim 1, wherein the light diffusing layer comprises a photochromatic layer, wherein the photochromatic layer comprises one or more layers comprising silver halide or a photochromatic pigment.

10. The diffusion lens of claim 1, wherein luminance variation is a change in luminous intensity of light passing through a first portion and a second portion of the diffusion lens.

11. The diffusion lens of claim 1, wherein reduced luminance variation is a decrease in the change in luminous intensity of light passing through a first portion and a second portion of the diffusion lens compared to a change in luminous intensity of light passing through a first portion and a second portion of a comparable surface without a light diffusing layer.

12. A method of modulating luminous intensity of light from a light source, the method comprising:
 a) providing at least one light source;
 b) providing a diffusion lens according to claim 1 interposed between a viewer and the at least one light source; and
 c) adjusting a transmittance of the diffusion lens in accordance with a luminous intensity of light from the at least one light source such that transmittance of the diffusion lens varies inversely with luminous intensity.

13. The method of claim 12 wherein the light source comprises one or more LEDs.

14. The method of claim 12, wherein the diffusion lens comprises at least one of the following: polymer-dispersed liquid crystals (PDLCs), electrochromatic materials, and photochromic materials.

15. The method of claim 12, wherein the transmittance of the diffusion lens is adjusted by applying a voltage to the luminance adjusting layer, wherein the lens comprises two or more transparent electrodes and a liquid crystal layer comprising polymer-dispersed liquid crystals.

16. The method of claim 12, wherein the transmittance of the diffusion lens is adjusted by applying a voltage to the diffusion lens, wherein the diffusion lens comprises two or more transparent electrodes and an electrochromatic layer.

17. The method of claim 12, wherein the transmittance of the diffusion lens is adjusted by altering the absorbance of the diffusion lens, wherein the diffusion lens comprises photochromatic layer comprised of one or more layers comprising silver halide or a photochromatic pigment.

18. A light source comprising:
 a substrate; and
 a diffusion lens according to claim 1, wherein the light diffusing layer is configured to adjust light transmittance through the layer in accordance with luminous intensity so as to reduce differences in the luminous intensity of light exiting the light source.

19. The light source of claim 18, wherein the light source comprises 2 or more light sources.

20. The light source of claim 18, wherein the light source is larger than 150 mm$^2$.

21. The light source of claim 18, wherein the diffusion lens comprises one or more of the following: a polymer-dispersed liquid crystal (PDLC), an electrochromatic material, and a photochromic material.

22. The light source of claim 18, wherein the diffusion lens comprises a photochromatic layer comprised of one or more layers comprising at least one of a silver halide or a photochromatic pigment.

23. The light source of claim 18, wherein the diffusion lens comprises two or more transparent electrodes and a liquid crystal layer comprising polymer-dispersed liquid crystals.

24. The light source of claim 18, wherein the diffusion lens comprises two or more transparent electrodes and an electrochromatic layer.

25. The light source of claim 18, wherein the diffusion lens is on top of a surface of the substrate.

26. The light source of claim 18, wherein the light source comprises a LED.

27. A method of modulating luminous intensity of light from a light source, the method comprising:
 a) providing at least one light source;
 b) providing a diffusion lens according to claim 1 interposed between a viewer and the at least one light source; and
 c) directing light from the light source to the diffusion lens such that transmittance from the diffusion lens varies inversely with luminous intensity.

* * * * *